March 14, 1939.　　　　J. J. MIZER　　　　2,150,628
SAFETY STOP FOR AUTOMOBILE HOISTS
Filed Aug. 13, 1938　　　3 Sheets-Sheet 3
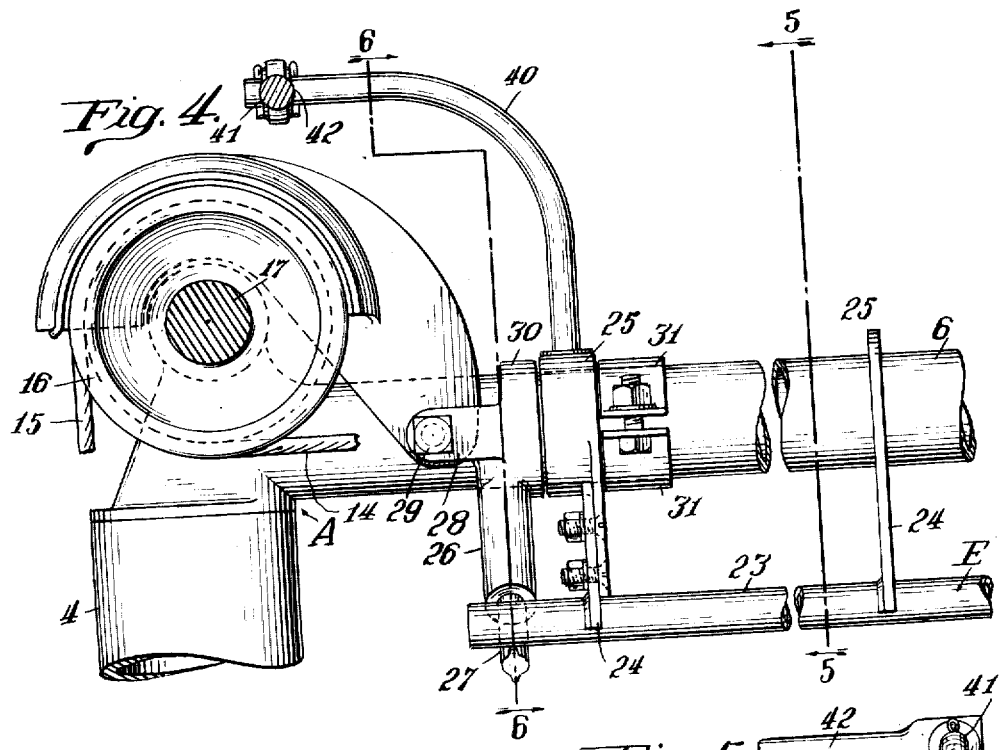
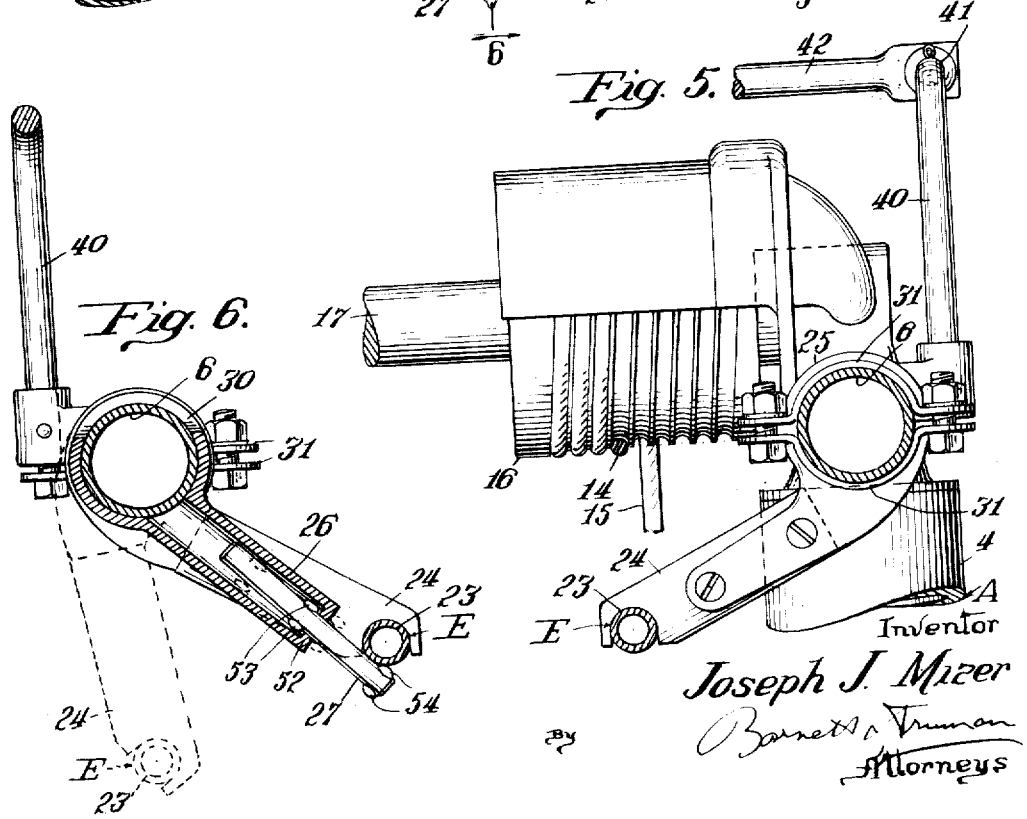
Inventor
Joseph J. Mizer
By Barnett Truman
Attorneys Patented Mar. 14, 1939

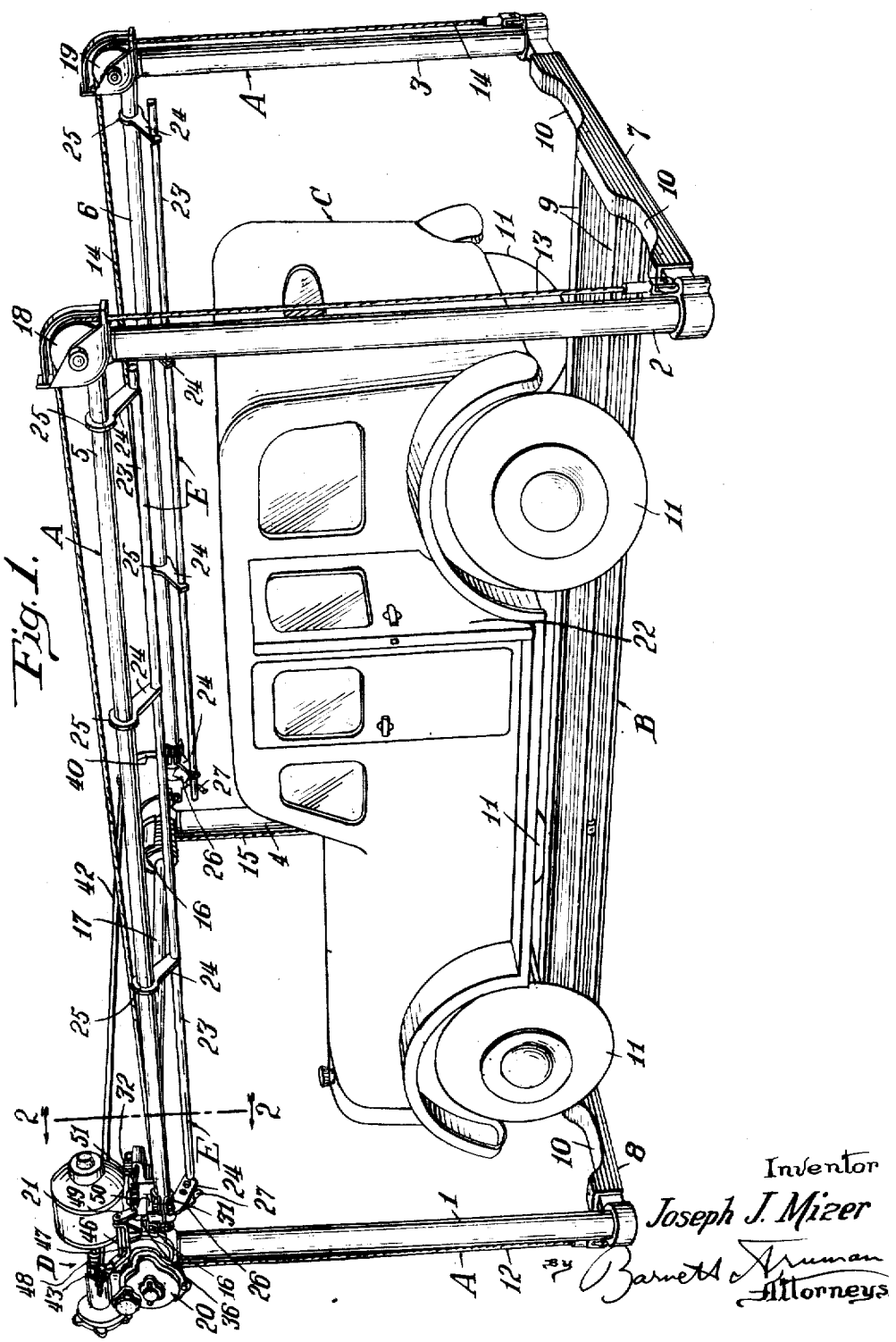

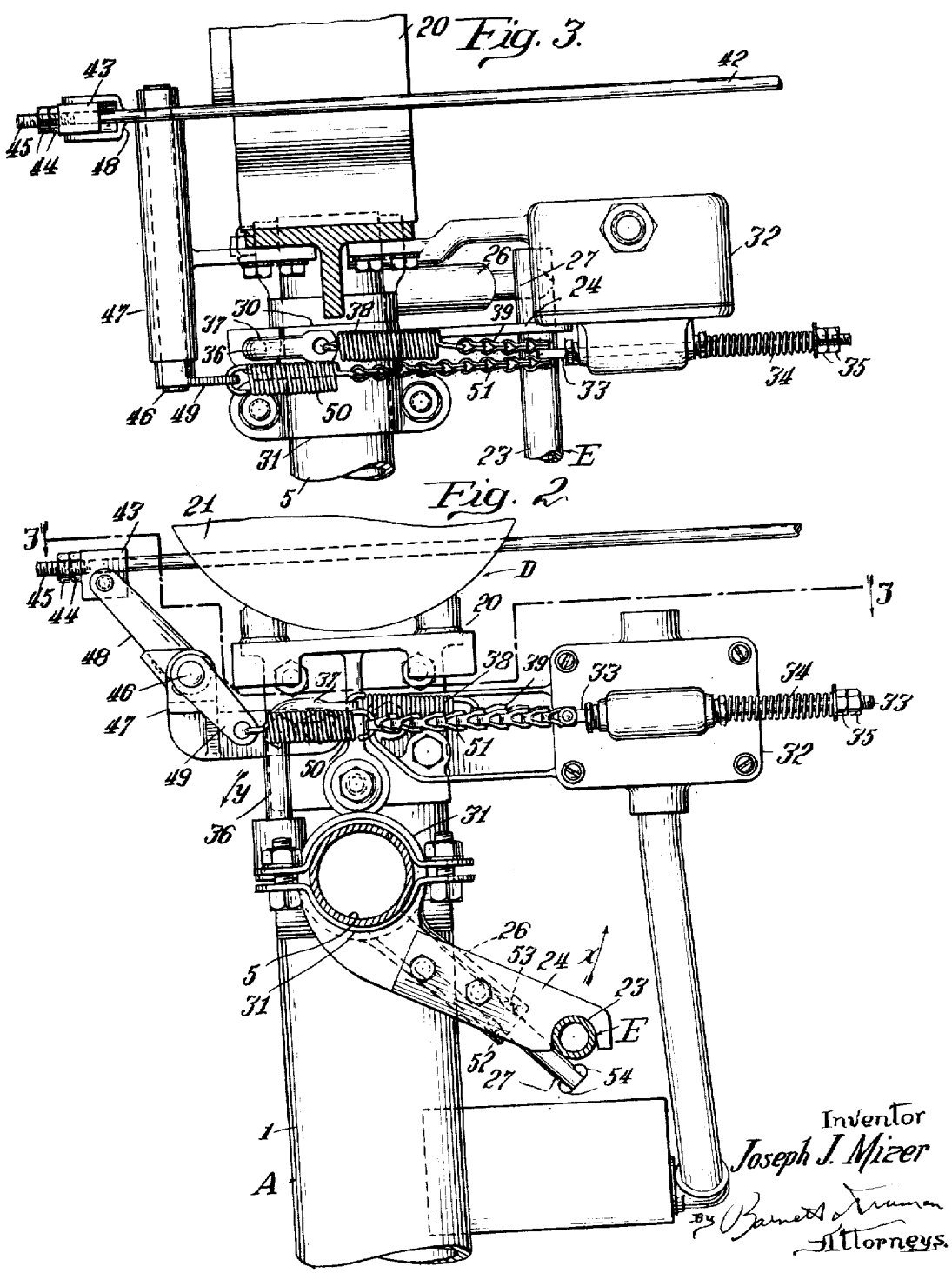

2,150,628

UNITED STATES PATENT OFFICE 2,150,628

SAFETY STOP FOR AUTOMOBILE HOISTS

Joseph J. Mizer, Racine, Wis., assignor to Walker Manufacturing Company, Racine, Wis., a corporation of Wisconsin Application August 13, 1938, Serial No. 224,688

14 Claims. (Cl. 254—89)

This invention relates to certain new and useful improvements in safety stop mechanism for automobile hoists, and more particularly to mechanism for automatically stopping the hoisting mechanism and lifting carriage in the event that a car-door has been left open so that it might be damaged or broken away by engagement with a portion of the fixed supporting framework of the hoist.

This improvement is especially designed for use with an automobile hoist of the general type disclosed in the patent to Walker 1,958,026, granted May 8, 1934. This type of hoist comprises a plurality of fixed uprights or posts (usually four) positioned about a clear space into which the automobile may be driven over a lifting carriage which is guided for vertical movement between the uprights. The uprights comprise a portion of the supporting frame-work which carries the mechanism for raising and lowering the carriage, all of this lifting mechanism being mounted either in or adjacent the uprights, and at the top of the frame outside of the vertical path of travel of the automobile so that when the carriage and automobile is elevated, the space between the uprights and beneath the car will be entirely clear. The pairs of uprights at each side of the car or automobile are connected at their upper ends by longitudinally extending, substantially horizontal, frame members which are out side of the normal path of vertical travel of the car. However, if a car door should be accidentally left open, it might be damaged by engagement with one of these side frame members, and the same would be true if any other object on the car or carriage were left projecting far enough to one side to engage with one of the frame members.

According to the present invention, longitudinally extending bars are movably supported by the side frame members so as to be engaged by the open door, or other laterally projecting member, and the movement of either of these bars acts, through suitable connections, to stop the hoisting mechanism, usually by opening a switch in the circuit which supplies power to the driving motor.

The principal object of this invention is to provide an improved safety stop mechanism of the type briefly described hereinabove and disclosed more in detail in the specifications which follow.

Another object is to provide means for temporarily swinging the shut-off bars to an inoperative position so that an unusually wide car or light truck can be elevated by the hoist.

Another object is to provide means whereby the shut-off bars are independently movable to operate the stop mechanism.

Other objects and advantages of this invention will be more apparent from the following detailed description of one approved form of apparatus constructed and operating according to the principles of this invention.

In the accompanying drawings:

Fig. 1 is a perspective view of the hoist with an automobile positioned therein, before the carriage and automobile are elevated.

Fig. 2 is an enlarged detail view of a portion of the upper left-hand corner of the hoist assembly, taken substantially as indicated by the line 2—2 of Fig. 1.

Fig. 3 is a horizontal section taken substantially on the line 3—3 of Fig. 2.

Fig. 4 is an enlarged detail view of the upper right-hand corner of the hoist assembly looking outwardly, that is in a direction away from the motor mechanism.

Fig. 5 is a vertical section taken substantially on the line 5—5 of Fig. 4.

Fig. 6 is a vertical section taken substantially on the line 6—6 of Fig. 4.

The hoist comprises the fixed framework A in which is guided the carriage B which lifts the automobile C, the hoisting mechanism for raising and lowering the carriage being indicated generally at D. The improved safety stop which is the particular subject matter of the present application is indicated generally at E.

The hoist frame A in the form here shown by way of example, comprises the four similar uprights or posts 1, 2, 3 and 4, positioned outside of the corners of the clear space into which the automobile C is driven. The uprights 1 and 2 at one side of the frame are connected at their upper ends by the longitudinally extending side frame member 5, here shown in the form of a tubular pipe section. A similar upper side frame member 6 connects the uprights 3 and 4 at the other side of the frame.

The carriage B comprises similar end cross members 7 and 8, guided at their ends by the frame uprights, and connected by a pair of longitudinally extending beams 9 which engage beneath the car, between the wheels, in order to raise and lower the car. The end cross-beams 7 and 8 are preferably provided with depressed portions or ramps 10 to facilitate driving the car into or out of position over the carriage. Preferably the upper portion of the frame and hoisting mechanism is sufficiently elevated to permit the car to be driven in at one end of the frame and out at the other. Alternatively as is usual in hoists of this type, the end members 7 and 8 may be connected by runways onto which the wheels 11 of the automobile are driven, in which case the central beams 9 would be omitted.

The hoisting mechanism D comprises four lifting cables 12, 13, 14 and 15 which extend upwardly from the four corners of carriage B adjacent the four uprights 1, 2, 3 and 4, respectively. The cables 12 and 15 extend up to and are coiled on two similar drums 16 mounted on the ends of a shaft 17 supported at the upper ends of uprights 1 and 4. Only one of the drums 16 is shown in Fig. 1. The other pair of cables 13 and 14 extend upwardly over direction sheaves 18 and 19 supported at the upper ends of uprights 2 and 3, respectively, and then extend to and are coiled on the respective drums 16. The mechanism indicated generally at 20 and including the electric motor 21 is supported at the upper end of upright 1 and serves to rotate transverse shaft 17 and drums 16 so as to raise or lower the carriage B. The detailed construction of this driving mechanism and the controls therefor are not here shown in detail but one approved form of such mechanism is disclosed in the Walker patent hereinabove referred to. As far as the present invention is concerned, any approved means may be utilized for raising and lowering the carriage. It will be apparent that the principal function of the upper side frame members 5 and 6 is to brace apart the uprights against the pull of the longitudinally extending lifting cables 13 and 14.

It will be understood that in the normal operation of this hoist the carriage B will elevate the automobile C so that it will move upwardly between the side frame members 5 and 6 which are spaced apart sufficiently to provide ample clearance for this movement. However, if a car door were accidentally left open (as indicated, for example at 22 in Fig. 1) this door would engage beneath the side frame member 5 and would be damaged. The particular object of the present invention is to provide safety means for automatically stopping the hoisting mechanism in case a door is accidentally left open in position to engage one of the side frame members 5 or 6.

This improved safety mechanism E comprises a pair of similar longitudinally extending shut-off bars 23, one of which extends substantially parallel to and is movably supported by each of the side frame members 5 and 6. These operating assemblies at the two sides of the frame are substantially identical (except for the features hereinafter specifically noted) and a description of one will suffice for both. The bar 23 is supported at the lower ends of a plurality of spaced apart arms 24, each of which has a circular collar 25 at its upper end pivoted on the tubular member 5 or 6. These collars may be slid into position on the frame member from one end thereof. At one end of the frame (preferably the far or motor-supporting end, as shown in Fig. 1) a stop bracket arm 26 is provided which projects inwardly and downwardly, the lower retractible end portion 27 of this stop bracket supporting one end of the shut-off bar 23 (see Figs. 2, 4 and 6). The stop bracket arm 26 is conveniently fixed in position by providing a laterally extending ear 28 held in place by one of the frame bolts 29. It will be noted that the rotatable supporting collar 25 of arm 24 at this end of the assembly is held in place between the collar 30 of stop arm 26, and a two-part clamp collar 31 secured about the side frame 5 or 6, thus holding the shut-off bar assembly against longitudinal movement on the frame member. It will now be observed that each shut-off bar 23 is normally supported in a position below and inwardly of the respective side arms so that if engaged by a car door 22, or similar outwardly projecting object on the carriage or car, the shut-off bar will be swung inwardly and upwardly about its supporting frame member.

Referring now more particularly to Figs. 2 and 3, a snap-switch 32 is provided in the energizing circuit for motor 21. The pull-rod 33 which operates this switch is normally held to the right (Figs. 2 and 3) by spring 34, adjusted by nuts 35, so as to maintain the switch in closed position. A crank-arm 36 projects upwardly from the supporting assembly of shut-off bar 23 at this corner of the hoist. As the shut-off bar 23 is swung inwardly and upwardly, as indicated by the arrow $x$ (Fig. 2) the crank-arm 36 will be simultaneously swung outwardly and downwardly in the direction of the arrow $y$. The inturned upper end 37 of crank-arm 36 is connected through the pull-connection comprising spring 38 and chain 39 with the inner or left-hand end of operating rod 33 of the snap switch. Consequently, if shut-off bar 23 is engaged by the open door of a car and swung upwardly, the crank arm 36 will be swung outwardly and through the pull connections 38 and 39 will draw out the operating rod 33 so as to move snap switch 32 to open position, thus cutting off the power to motor 21 and stopping the hoisting mechanism. The function of spring 38 is to permit an excess swinging movement of the shut-off bar and crank arm 36, after the operation of the snap-switch has been completed.

Referring now to Figs. 4, 5 and 6, a crank arm 40 extends upwardly and rearwardly from the shut-off bar assembly at the other side of the hoist. The upper end of crank arm 40 is pivotally connected at 41 with one end of a link or rod 42 which extends across the end of the hoist to the motor-supporting corner, as indicated in Figs. 2 and 3. On this latter end of rod 42 is mounted a trunnion block 43 adjustably held in position by nuts 44 threaded on the end portion 45 of pull-rod 42. A rock-shaft 46 is mounted in bracket 47 supported by the hoist frame. A crank arm 48 on on end of rock shaft 46 connects with trunnion block 43. A second crank arm 49 on the other end of rock-shaft 46 connects through spring 50 and chain 51 with the inner end of switch operating rod 33, the pull connection 50, 51 being similar in all aspects to the first described pull-connection 38, 39. It will now be apparent that when shut-off bar 23 at the far side of the hoist (Fig. 1) is swung upwardly and inwardly, it will, through the operating connections comprising crank arm 40, link 42, crank arm 48, rock-shaft 46, and crank arm 49, operate the pull-connection 50, 51 to open switch 32. It will now be apparent that either of the shut-off bars 23 will, when swung upwardly, operate the snap switch 32 quite independent of the other shut-off bar and its connections.

Referring now more particularly to Figs. 2 and 6, it will be noted that the main portion of stop-arm 26 is of hollow tubular form, and the retractible end portion 27 is in the form of a rod slidable in said tubular portion. The lower end of tubular portion 26 is formed with an inturned collar 52 which is engaged by stop-projections 53 formed on an intermediate portion of rod 27 to limit the downward sliding movement of rod 27 when in its normal position, as shown in Figs.

2 and 6. The rod portion 27 may be pushed upwardly into tube 26, as shown in dotted lines (Fig. 6) its movement in this direction being limited by stop-projections 54 on the lower end portion of bar 27. When in this retracted position, the shut-off bar 23 will be released so that it may swing down to the position shown in dotted lines (Fig. 6). This will permit a car of somewhat greater width, for example, a light truck, to be elevated by the hoist. Obviously, while the shut-off bars are thus temporarily released, the open-door stop mechanism will be inoperative.

While this improved safety stop mechanism is designed particularly to prevent damage to car doors accidentally left open, it will be apparent that the same safety mechanism will be operated by any other substantially rigid object on the car or carriage which may happen to project laterally outside of the normal path of vertical travel of the car.

It will be understood that the two shut-off bars 23 might be hooked together so as to be simultaneously movable and connected to the switch by a single yieldable pull-connection, such as 50, 51, but the connections as hereinabove disclosed are preferable, as the effort is reduced by requiring movement of only one of the bars to open the switch.

I claim:

1. In combination with an automobile hoist comprising a carriage for supporting the automobile, a frame comprising two pairs of spaced apart uprights between which the carriage is guided, and longitudinally extending side members connecting the upper portions of the respective pairs of uprights adjacent to but outside of the normal path of vertical travel of the automobile, means carried by the frame and comprising a motor for raising and lowering the carriage, and a switch for stopping the motor, means movably carried by the respective side-members and positioned to be engaged and moved by an object on the carriage projecting laterally outside the normal path of vertical travel of the automobile, and mechanism operated by the movement of the last-mentioned means for operating the switch to stop the motor.

2. In combination with an automobile hoist comprising a carriage for supporting the automobile, a frame comprising two pairs of spaced apart uprights between which the carriage is guided, and longitudinally extending side members connecting the upper portions of the respective pairs of uprights adjacent to but outside of the normal path of vertical travel of the automobile, means carried by the frame and comprising a motor for raising and lowering the carriage, and a switch for stopping the motor, means pivotally carried by the respective side-members and positioned to be engaged and moved by an object on the carriage projecting laterally outside the normal path of vertical travel of the automobile, and mechanism operated by the movement of the last-mentioned means for operating the switch to stop the motor.

3. In combination with an automobile hoist comprising a carriage for supporting the automobile, a frame comprising two pairs of spaced apart uprights between which the carriage is guided, and longitudinally extending side members connecting the upper portions of the respective pairs of uprights adjacent to but outside of the normal path of vertical travel of the automobile, and motor-operated means carried by the frame for raising and lowering the carriage, shut-off bars extending substantially parallel to the respective side members and positioned to be engaged and moved by an object on the carriage projecting laterally outside the normal path of vertical travel of the automobile, means for pivotally supporting one of the shut-off bars from each of the side members, and mechanism operated by the movement of the bars for stopping the motor-operated means.

4. In combination with an automobile hoist comprising a carriage for supporting the automobile, a frame comprising two pairs of spaced apart uprights between which the carriage is guided, and longitudinally extending side members connecting the upper portions of the respective pairs of uprights adjacent to but outside of the normal path of vertical travel of the automobile, means carried by the frame comprising a motor for raising and lowering the carriage, and a switch for stopping the motor, shut-off bars movably carried by and extending substantially parallel to the respective side members and positioned to be engaged and moved by an object on the carriage projecting laterally outside the normal path of vertical travel of the automobile, and mechanical connections between the bars and switch operated by the movement of the bars for operating the switch to stop the motor.

5. In combination with an automobile hoist comprising a carriage for supporting the automobile, a frame comprising two pairs of spaced apart uprights between which the carriage is guided, and longitudinally extending side members connecting the upper portions of the respective pairs of uprights adjacent to but outside of the normal path of vertical travel of the automobile, means carried by the frame comprising a motor for raising and lowering the carriage, and a switch for stopping the motor, shut-off bars movably carried by and extending substantially parallel to the respective side members and positioned to be engaged and moved by an object on the carriage projecting laterally outside the normal path of vertical travel of the automobile, and mechanical connections between the bars and switch operated by the movement of the bars for operating the switch to stop the motor, said connections including an extensible spring for permitting additional movement of the bars after the switch has been operated.

6. In combination with an automobile hoist comprising a carriage for supporting the automobile, a frame comprising two pairs of spaced apart uprights between which the carriage is guided, and longitudinally extending side members connecting the upper portions of the respective pairs of uprights adjacent to but outside of the normal path of vertical travel of the automobile, means carried by the frame comprising a motor for raising and lowering the carriage, and a switch for stopping the motor, shut-off bars movably carried by and extending substantially parallel to the respective side members and positioned to be engaged and moved by an object on the carriage projecting laterally outside the normal path of vertical travel of the automobile, and separate connections between each bar and the switch so that movement of either bar will operate the switch to stop the motor.

7. In combination with an automobile hoist comprising a carriage for supporting the automobile, a frame comprising two pairs of spaced apart uprights between which the carriage is guided, and longitudinally extending side members connecting the upper portions of the respective pairs of uprights adjacent to but outside of the normal path of vertical travel of the automobile, means carried by the frame comprising a motor for raising and lowering the carriage, and a switch for stopping the motor, shut-off bars movably carried by and extending substantially parallel to the respective side members and positioned to be engaged and moved by an object on the carriage projecting laterally outside the normal path of vertical travel of the automobile, and separate connections between each bar and the switch so that movement of either bar will operate the switch to stop the motor, each of these connections comprising an extensible spring.

8. In combination with an automobile hoist comprising a carriage for supporting the automobile, a frame comprising two pairs of spaced apart uprights between which the carriage is guided, and longitudinally extending side members connecting upper portions of the respective pairs of uprights adjacent to but outside of the normal path of vertical travel of the automobile, means carried by the frame and comprising a motor for raising and lowering the carriage, and a switch for stopping the motor, shut-off bars extending substantially parallel to the respective side-members, a plurality of arms pivotally supporting each bar for swinging movement about its respective side member, a stop-arm fixed to each side member and projecting inwardly and downwardly to engage beneath and normally support the adjacent bar in position to be engaged and swung upwardly by an object on the carriage projecting outwardly beyond the normal path of vertical travel of the automobile, and connections between each bar and the switch whereby the upward swinging movement of either bar will operate the switch to stop the motor.

9. In combination with an automobile hoist comprising a carriage for supporting the automobile, a frame comprising two pairs of spaced apart uprights between which the carriage is guided, and longitudinally extending side members connecting upper portions of the respective pairs of uprights adjacent to but outside of the normal path of vertical travel of the automobile, means carried by the frame and comprising a motor for raising and lowering the carriage, and a switch for stopping the motor, shut-off bars extending substantially parallel to the respective side-members, a plurality of arms pivotally supporting each bar for swinging movement about its respective side member, a stop-arm fixed to each side member and projecting inwardly and downwardly to engage beneath and normally support the adjacent bar in position to be engaged and swung upwardly by an object on the carriage projecting outwardly beyond the normal path of vertical travel of the automobile, and connections between each bar and the switch whereby the upward swinging movement of either bar will operate the switch to stop the motor, each of said connections comprising an extensible spring permitting additional movement of the bar after the switch has been operated.

10. In combination with an automobile hoist comprising a carriage for supporting the automobile, a frame comprising two pairs of spaced apart uprights between which the carriage is guided, and longitudinally extending side members connecting upper portions of the respective pairs of uprights adjacent to but outside of the normal path of vertical travel of the automobile, means carried by the frame and comprising a motor for raising and lowering the carriage, and a switch for stopping the motor, shut-off bars extending substantially parallel to the respective side-members, a plurality of arms pivotally supporting each bar for swinging movement about its respective side member, a stop-arm fixed to each side member and projecting inwardly and downwardly to engage beneath and normally support the adjacent bar in position to be engaged and swung upwardly by an object on the carriage projecting outwardly beyond the normal path of vertical travel of the automobile, the outer portion of each stop-arm being retractible to permit the shut-off bar to swing downwardly to a position beneath the side member, and connections between each bar and the switch whereby the upward swinging movement of either bar will operate the switch to stop the motor.

11. In combination with an automobile hoist comprising a carriage for supporting the automobile, a frame comprising two pairs of spaced apart uprights between which the carriage is guided, and longitudinally extending side members connecting upper portions of the respective pairs of uprights adjacent to but outside of the normal path of vertical travel of the automobile, means carried by the frame and comprising a motor for raising and lowering the carriage, and a switch for stopping the motor, shut-off bars extending substantially parallel to the respective side-members, a plurality of arms pivotally supporting each bar for swinging movement about its respective side member, a stop-arm fixed to each side member and projecting inwardly and downwardly to engage beneath and normally support the adjacent bar in position to be engaged and swung upwardly by an object on the carriage projecting outwardly beyond the normal path of vertical travel of the automobile, a crank-arm projecting from one end portion of each shut-off bar assembly and swinging simultaneously therewith, and pull-connections extending independently from each crank-arm to the switch to stop the motor when either shut-off bar is swung upwardly.

12. In combination with an automobile hoist comprising a carriage for supporting the automobile, a frame comprising two pairs of spaced apart uprights between which the carriage is guided, and longitudinally extending side members connecting upper portions of the respective pairs of uprights adjacent to but outside of the normal path of vertical travel of the automobile, means carried by the frame and comprising a motor for raising and lowering the carriage, and a switch for stopping the motor, shut-off bars extending substantially parallel to the respective side-members, a plurality of arms pivotally supporting each bar for swinging movement about its respective side member, a stop-arm fixed to each side member and projecting inwardly and downwardly to engage beneath and normally support the adjacent bar in position to be engaged and swung upwardly by an object on the carriage projecting outwardly beyond the normal path of vertical travel of the automobile, a crank-arm projecting from one end portion of each shut-off bar assembly and swinging simultaneously therewith, and pull-connections extending independently from each crank-arm to the switch to stop the motor when either shut-off bar is swung upwardly, each of said connections comprising an extensible spring.

13. In combination with an automobile hoist comprising a carriage for supporting the automobile, a frame comprising two pairs of spaced apart uprights between which the carriage is guided, and longitudinally extending side members connecting upper portions of the respective pairs of uprights adjacent to but outside of the normal path of vertical travel of the automobile, means carried by the frame for raising and lowering the carriage, shut-off bars extending substantially parallel to the respective side-members, a plurality of arms pivotally supporting each bar for swinging movement about its respective side member, a stop-arm fixed to each side member and projecting inwardly and downwardly to engage beneath and normally support the adjacent bar in position to be engaged and swung upwardly by an object on the carriage projecting outwardly beyond the normal path of vertical travel of the automobile, and connections between each bar and the raising and lowering means whereby the upward swinging movement of either bar will stop the vertical movement of the carriage.

14. In combination with an automobile hoist comprising a carriage for supporting the automobile, a frame comprising two pairs of spaced apart uprights between which the carriage is guided, and longitudinally extending side members connecting upper portions of the respective pairs of uprights adjacent to but outside of the normal path of vertical travel of the automobile, means carried by the frame for raising and lowering the carriage, shut-off bars extending substantially parallel to the respective side-members, a plurality of arms pivotally supporting each bar for swinging movement about its respective side member, a stop-arm fixed to each side member and projecting inwardly and downwardly to engage beneath and normally support the adjacent bar in position to be engaged and swung upwardly by an object on the carriage projecting outwardly beyond the normal path of vertical travel of the automobile, the outer portion of each stop-arm being retractible to permit the shut-off bar to swing downwardly to a position beneath the side member, and connections between each bar and the raising and lowering means whereby the upward swinging movement of either bar will stop the vertical movement of the carriage.

JOSEPH J. MIZER.

CERTIFICATE OF CORRECTION.

Patent No. 2,150,628.  March 14, 1939.

JOSEPH J. MIZER.

It is hereby certified that error appears in the printed specification of the above numbered patent requiring correction as follows: Page 2, second column, line 49, for the word "on" read one; and second column, line 54, for "aspects" read respects; and that the said Letters Patent should be read with this correction therein that the same may conform to the record of the case in the Patent Office.

Signed and sealed this 25th day of April, A.D. 1939.

Henry Van Arsdale (Seal)  Acting Commissioner of Patents.

comprising a carriage for supporting the automobile, a frame comprising two pairs of spaced apart uprights between which the carriage is guided, and longitudinally extending side members connecting upper portions of the respective pairs of uprights adjacent to but outside of the normal path of vertical travel of the automobile, means carried by the frame for raising and lowering the carriage, shut-off bars extending substantially parallel to the respective side-members, a plurality of arms pivotally supporting each bar for swinging movement about its respective side member, a stop-arm fixed to each side member and projecting inwardly and downwardly to engage beneath and normally support the adjacent bar in position to be engaged and swung upwardly by an object on the carriage projecting outwardly beyond the normal path of vertical travel of the automobile, and connections between each bar and the raising and lowering means whereby the upward swinging movement of either bar will stop the vertical movement of the carriage.

14. In combination with an automobile hoist comprising a carriage for supporting the automobile, a frame comprising two pairs of spaced apart uprights between which the carriage is guided, and longitudinally extending side members connecting upper portions of the respective pairs of uprights adjacent to but outside of the normal path of vertical travel of the automobile, means carried by the frame for raising and lowering the carriage, shut-off bars extending substantially parallel to the respective side-members, a plurality of arms pivotally supporting each bar for swinging movement about its respective side member, a stop-arm fixed to each side member and projecting inwardly and downwardly to engage beneath and normally support the adjacent bar in position to be engaged and swung upwardly by an object on the carriage projecting outwardly beyond the normal path of vertical travel of the automobile, the outer portion of each stop-arm being retractible to permit the shut-off bar to swing downwardly to a position beneath the side member, and connections between each bar and the raising and lowering means whereby the upward swinging movement of either bar will stop the vertical movement of the carriage.

JOSEPH J. MIZER.

CERTIFICATE OF CORRECTION.

Patent No. 2,150,628.     March 14, 1939.

JOSEPH J. MIZER.

It is hereby certified that error appears in the printed specification of the above numbered patent requiring correction as follows: Page 2, second column, line 49, for the word "on" read one; and second column, line 54, for "aspects" read respects; and that the said Letters Patent should be read with this correction therein that the same may conform to the record of the case in the Patent Office.

Signed and sealed this 25th day of April, A.D. 1939.

Henry Van Arsdale (Seal)     Acting Commissioner of Patents.